United States Patent
Takama et al.

(10) Patent No.: US 9,784,941 B2
(45) Date of Patent: Oct. 10, 2017

(54) OPTICAL APPARATUS AND IMAGING SYSTEM INCLUDING THE SAME

(71) Applicant: DENSO CORPORATION, Kariya, Aichi-pref. (JP)

(72) Inventors: Daisuke Takama, Kariya (JP); Takayuki Kimura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/905,704

(22) PCT Filed: Jul. 9, 2014

(86) PCT No.: PCT/JP2014/068321
§ 371 (c)(1),
(2) Date: Jan. 15, 2016

(87) PCT Pub. No.: WO2015/008678
PCT Pub. Date: Jan. 22, 2015

(65) Prior Publication Data
US 2016/0161701 A1    Jun. 9, 2016

(30) Foreign Application Priority Data

Jul. 18, 2013    (JP) ................................. 2013-149808

(51) Int. Cl.
*G02B 9/00*        (2006.01)
*G02B 7/02*        (2006.01)
(Continued)

(52) U.S. Cl.
CPC ............. *G02B 7/028* (2013.01); *G02B 7/021* (2013.01); *G02B 13/16* (2013.01); *H04N 5/2254* (2013.01)

(58) Field of Classification Search
USPC ....................................................... 359/754
See application file for complete search history.

(56) References Cited

U.S. PATENT DOCUMENTS 4,918,702 A    4/1990    Kimura
5,973,319 A    10/1999  Washisu
(Continued)

FOREIGN PATENT DOCUMENTS

JP    H01-172809 A    7/1989
JP    H09-281538 A    10/1997
(Continued)

OTHER PUBLICATIONS

International Preliminary Report on Patentability; International Application No. PCT/JP2014/068321; Filed Jul. 9, 2014 (with English translation).
(Continued)

*Primary Examiner* — James Jones
(74) *Attorney, Agent, or Firm* — Knobbe, Martens, Olson & Bear, LLP (57) ABSTRACT

An optical apparatus captures imaging light entering into an imager to acquire an image of an object. The optical apparatus includes a lens module and a support. The lens module is configured by a combination of two or more lenses, captures the imaging light through the lenses, and focuses the captured imaging light on the imager. The support supports the lens module at a position apart from the imager by a predetermined distance, such that the imager and the lenses are aligned on the optical axis, and a focal point of the imaging light is formed on the imager. The support is formed such that an expansion-contraction ratio, at which the support expands or contracts along the optical axis in accord with changes in ambient temperature of the optical apparatus, becomes a first expansion-contraction ratio at which the support expands or contracts so as to cancel a movement of the focal point occurring in the lens module along the optical axis in accord with the changes in ambient temperature of the optical apparatus.

16 Claims, 5 Drawing Sheets (51) Int. Cl.
*G02B 13/16* (2006.01)
*H04N 5/225* (2006.01)

(56) References Cited

U.S. PATENT DOCUMENTS

| | | | |
|---|---|---|---|
| 2010/0053414 A1* | 3/2010 | Tamaki | G01C 3/085 348/340 |
| 2012/0211640 A1 | 8/2012 | Suzuki | |
| 2016/0097912 A1* | 4/2016 | Kobori | H04N 5/2254 359/820 |

FOREIGN PATENT DOCUMENTS

| | | |
|---|---|---|
| JP | 2000-002829 A | 1/2000 |
| JP | 2001-281514 A | 10/2001 |
| JP | 2002-014269 A | 1/2002 |
| JP | 2004-147188 A | 5/2004 |
| JP | 2005-101306 A | 4/2005 |
| JP | 2005-176117 A | 6/2005 |
| JP | 2005-244387 A | 9/2005 |
| JP | 2007-148021 A | 6/2007 |
| JP | 2007-311943 A | 11/2007 |
| JP | 2008-242310 A | 10/2008 |
| JP | 2009-037009 A | 2/2009 |
| JP | 2010-039405 A | 2/2010 |
| JP | 2010-204501 A | 9/2010 |
| JP | 2010-282025 A | 12/2010 |
| JP | 2011-130015 A | 6/2011 |
| JP | 2011-145323 A | 7/2011 |
| JP | 2011-146771 A | 7/2011 |
| JP | 2011-147042 A | 7/2011 |
| JP | 2011-176674 A | 9/2011 |
| JP | 2012-175273 A | 9/2012 |
| WO | 2009/087974 A1 | 7/2009 |
| WO | 2015/008678 A1 | 1/2015 |

OTHER PUBLICATIONS

International Search Report (translated version); International Application No. PCT/JP2014/068321, filed Jul. 9, 2014; 3 pages.

* cited by examiner

(STATE AT LOW TEMPERATURES)

(a)

(STATE AT HIGH TEMPERATURES)

(STATE AT LOW TEMPERATURES)

(a)

(STATE AT HIGH TEMPERATURES)

FLOW DIRECTION (a)

OPTICAL APPARATUS AND IMAGING SYSTEM INCLUDING THE SAME

CROSS-REFERENCE TO RELATED APPLICATION

This application is a U.S. National Phase Application under 35 U.S.C. 371 of International Application No. PCT/JP2014/068321 filed on Jul. 9, 2014 and published in Japanese as WO 2015/008678 A1 on Jan. 22, 2015. This application is based on and claims the benefit of priority from Japanese Patent Application No. 2013-149808, filed Jul. 18, 2013. The entire disclosures of all of the above applications are incorporated herein by reference.

TECHNICAL FIELD

The present invention relates to an optical apparatus that captures imaging light entering into an imager to acquire an image of an object, and an imaging system, such as a vehicle camera, that includes the optical apparatus.

BACKGROUND ART

An optical apparatus described in PTL 1 includes an outer cylindrical portion (holder, base, and the like) and an inner cylindrical portion (lens tube) coaxially disposed inside the outer cylindrical portion. The optical apparatus has a structure in which the outer cylindrical portion is formed into a shape longer in an axial direction than the inner cylindrical portion. In this structure, one end portion of the outer cylindrical portion is connected to one end portion of the inner cylindrical portion.

Since the inner cylindrical portion is shorter than the outer cylindrical portion, only the outer cylindrical portion surrounds and houses an imager therein. The inner cylindrical portion has another end portion to which a lens is fixed so as to face the imager.

Optical apparatuses for vehicle cameras are often exposed to high temperatures in summer, for example. Such an optical apparatus may have a configuration in which the lens is simply supported at a predetermined distance from the imager. In this case, the optical apparatus may expand due to high temperatures and thereby increase the distance between the imager and the lens and disable the lens from focusing on the imager.

The optical apparatus of PTL 1 takes measures against the case where the optical apparatus configured as mentioned above is exposed to high temperatures and the outer cylindrical portion is deformed in a direction away from the imager. In these measures, the inner cylindrical portion is deformed in a direction approaching the imager to perform compensation such that the position of the lens does not shift relative to the imager.

CITATION LIST

Patent Literature

[PTL 1] JP-A-2002-14269

SUMMARY OF INVENTION

Technical Problem

However, the above-described optical apparatus has a structure in which the inner cylindrical portion is fixed to the outer cylindrical portion at a position away from the lens on the opposite side of the side where the imager is positioned when viewed from the lens, and therefore this raises a problem of increasing the size of the optical apparatus.

The outer cylindrical portion of the above-described optical apparatus also plays a role of supporting the inner cylindrical portion. Therefore, the outer cylindrical portion is required to be so configured as to be thicker than the inner cylindrical portion. To this end, in the above-described optical apparatus, two materials having different thermal expansion-contraction ratios are required to be prepared.

When the quality of an image acquired by the imager is going to be improved, it is preferable to use a lens module that is a combination of a plurality of lenses, rather than using a single lens as in the above-described optical apparatus. However, the lens module has such characteristics that the focal point moves along the optical axis when ambient temperature rises. Therefore, when only one lens is simply configured not to move relative to the imager as in the above-described optical apparatus and when the ambient temperature of the optical apparatus rises with this configuration, focus is no longer formed on the imager.

The present invention has as its object to provide an optical apparatus which minimizes the increase in size of the optical apparatus and can be formed of a material having a single expansion-contraction ratio, and further, enables use of a lens module.

Solution to Problem

An optical apparatus captures imaging light entering into an imager to acquire an image of an object. The optical apparatus includes a lens module and a support. The lens module is configured by a combination of two or more lenses, captures the imaging light through the lenses, and focuses the captured imaging light on the imager. The support supports the lens module at a position apart from the imager by a predetermined distance, such that the imager and the lenses are aligned on the optical axis, and a focal point of the imaging light is located on the imager.

The support is formed such that an expansion-contraction ratio, at which the support expands or contracts along the optical axis in accord with changes in ambient temperature of the optical apparatus, becomes a first expansion-contraction ratio at which the support expands or contracts so as to cancel a movement of the focal point occurring in the lens module along the optical axis in accord with the changes in ambient temperature of the optical apparatus.

With this configuration, the support is only required to be of a size that enables the lens module to be disposed at a position apart from the imager by a predetermined distance. Unlike a conventional optical apparatus, this support is not required to be of a size that can reach a position away from the lens module on the opposite side of the side where the imager is positioned when viewed from the lens module. Therefore, increase in size of the optical apparatus can be minimized.

With this configuration, even when the focal point movement occurs in the lens module due to the increase in the ambient temperature of the optical apparatus, the support expands or contracts so as to cancel the focal point movement, and thus the lens module is usable. In addition, the support can be formed of a single material whose expansion-contraction ratio is ensured to be the first expansion-contraction ratio when the support is formed.

The first expansion-contraction ratio is the ratio of the length by which the support expands or contracts along the optical axis in accord with the increase and decrease in the ambient temperature of the optical apparatus.

The bracketed reference numbers assigned to the above means and the like recited in the claims are examples indicating correspondency with specific means and the like described in an embodiment set forth below. The present invention should not be construed as being limited to the specific means and the like indicated by the bracketed reference numbers assigned to the above means and the like recited in the claims.

DESCRIPTION OF EMBODIMENTS

With reference to the drawings, an embodiment of the present invention will be described.

Figure 1:
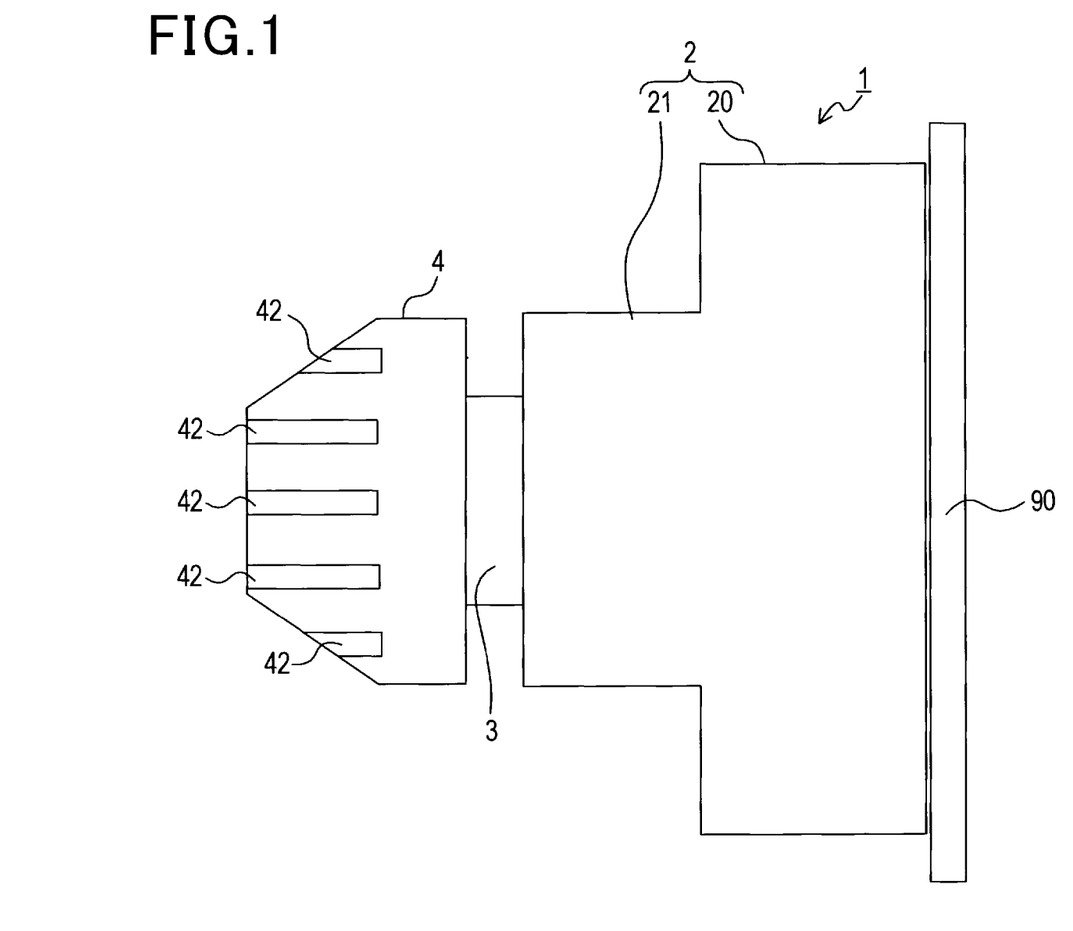
FIG. 1 is a side view illustrating an optical apparatus according to an embodiment.

FIG. 1 shows an optical apparatus 1 according to the present embodiment which is used in a camera for monitoring ahead of a vehicle (imaging system). The optical apparatus 1 captures imaging light into an imager to acquire an image of a forward object to be monitored.

As shown in FIG. 1, the camera includes a substrate 90 on which the imager described later is mounted. The imager is composed of an image pickup device, such as a charge-coupled device (CCD). The optical apparatus 1 according to the present embodiment is fixed to a surface of the substrate 90 so as to be located near the position where the imager is mounted.

The optical apparatus 1 includes a holder 2, a barrel 3 mounted to the holder 2, a cap 4 mounted to the barrel 3, and a lens module 5.

The holder 2 has a large-diameter cylindrical portion 20 having a large diameter and a small-diameter cylindrical portion 21 having a small diameter. The large- and small-diameter cylindrical portions 20 and 21 are coaxially arranged side by side in the axial direction so as to be formed into a shape with a step being formed therebetween.

The barrel 3 is formed into a circular cylindrical shape. The cap 4 is formed into a circular cylindrical shape in which an outer surface thereof on one axial-direction side is formed into a tapered shape. The lens module 5 is housed in the barrel 3 and the cap 4.

With reference to (a) and (b) of FIG. 2, each component of the optical apparatus 1 will be described in detail.

Figure 2:
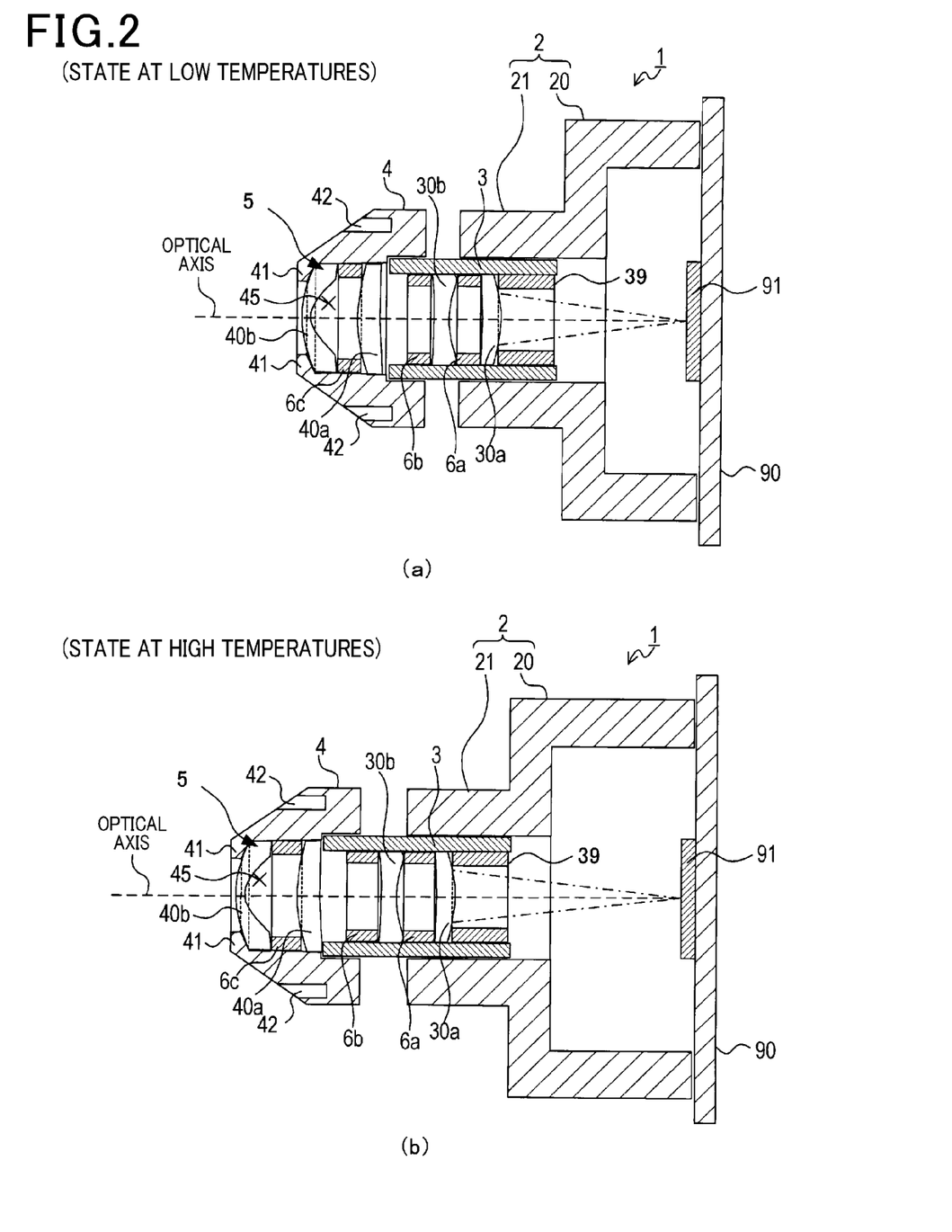
FIG. 2 is a cross-sectional view illustrating the optical apparatus according to the embodiment sectioned by a plane passing through an optical axis of the optical apparatus, in which (a) shows a low-temperature state and (b) shows a high-temperature state.

As shown in FIG. 2 by (a), the lens module 5 is configured by a combination of four lenses 30a, 30b, 40a and 40b, and spacers 6a to 6c that are housed in the barrel 3 and the cap 4. The lens module 5 captures imaging light through the lenses 30a, 30b, 40a and 40b, and focuses the imaging light on an imager 91 to acquire an image of a forward object to be monitored.

Then, the holder 2 holds the lens module 5 via the barrel 3 at a position away from the imager 91 by a predetermined distance. At this position, the lenses 30a, 30b, 40a and 40b configuring the lens module 5 and the imager 91 are aligned on the optical axis, and the imaging light is focused on the imager 91.

The holder 2 fixes the large-diameter cylindrical portion 20 onto the substrate 90 such that the optical axis of the imager 91 coincides with the center axis of the holder 2 (corresponding to the center axes of the large- and small-diameter cylindrical portions 20 and 21), i.e. the optical axis taken to be of the one in the optical apparatus 1.

The small-diameter cylindrical portion 21 of the holder 2 has an inner wall surface in which a thread, not shown, is formed around the center axis of the small-diameter cylindrical portion 21. In the following description, a direction along the optical axis of the imager 91 that is the direction from the imager 91 toward the small-diameter cylindrical portion 21 is referred to as forward, while the direction from the small-diameter cylindrical portion 21 toward the imager 91 is referred to as rearward.

The barrel 3 is formed into a circular cylindrical shape having a size of coaxially and threadably enabling engagement with the small-diameter cylindrical portion 21 of the holder 2. The barrel 3 has a rearward outer peripheral surface in which a thread, not shown, is formed. The barrel 3 has a forward outer peripheral surface in which a thread, not shown, is formed as well.

The rearward side of the barrel 3 is inserted into the small-diameter cylindrical portion 21 and further inserted up to a position where the thread on the small-diameter cylindrical portion 21 and the thread on the barrel 3 come into contact. When the barrel 3 is rotated about the axis after the insertion, the barrel 3 is threadably inserted into the small-diameter cylindrical portion 21 and coaxially mounted thereto.

The barrel 3 has an interior which is provided with a fixing ring 39 and the lens module 5 configured by the lenses 30a and 30b and the spacers 6a and 6b. Of these components, the fixing ring 39 is formed into a cylindrical shape. The fixing ring 39 is disposed on the rear end portion inside the barrel 3 and coaxially fixed to the barrel 3.

The spacers 6a and 6b are each formed into a ring shape and coaxially housed in the barrel 3. Inside the barrel 3, the lenses 30a and the like are disposed forward relative to the fixing ring 39 in the order of the lens 30a, the spacer 6a, the lens 30b, and the spacer 6b.

In this case, the lenses 30a and 30b are housed in the barrel 3 such that the optical axes thereof coincide with the center axis of the barrel 3.

The cap 4 is formed into a circular cylindrical shape and has an axially rearward inner peripheral surface provided with a space into which the forward end portion of the barrel 3 can be inserted. The portion forming the space into which the barrel 3 can be inserted has an inner peripheral surface in which a thread, not shown, is formed. The thread is threaded in the same direction as the thread formed in the small-diameter cylindrical portion 21 of the holder 2.

When the forward end portion of the barrel 3 is inserted into the space of the cap 4, in which the thread is formed, the thread of the barrel 3 firstly brought into contact with the thread of the cap 4. In this case, when the barrel 3 is rotated about the center axis, the forward end portion of the barrel 3 is threadably inserted into the cap 4, thereby mounting the cap 4 to the barrel 3.

The cap 4 has the other axial (forward) end whose peripheral surface is formed into a tapered shape toward the other axial end. The portion formed into a tapered shape is provided with a plurality of holes 42 for stopping slippage. The holes 42 are provided at even intervals around the center axis of the cap 4 (see FIG. 1).

The cap 4 is provided with a portion adjacent to the space into which the barrel 3 is inserted. The portion is on the other axial (forward) end and serves as a housing space 45 for disposing the lens 40a, the spacer 6c, and the lens 40b configuring the lens module 5. The housing space 45 is formed so as to have a smaller diameter than the space into which the barrel 3 is inserted. The difference in diameter creates a step portion in the boundary portion between the space into which the barrel 3 is inserted and the housing space 45 in which the lens 40a and the like are disposed. The barrel 3 can be inserted into the cap 4 up to a position of coming into contact with the step portion.

The cap 4 also includes a claw portion 41. The claw portion 41 is set up in the forward end portion of the housing space 45 being extended from the forward edge portion in the space toward the axial center. The claw portion 41 is circumferentially formed along the axially forward edge portion.

In the cap 4, the lens 40b, the lens 40a, and the spacer 6c are disposed rearward from the claw portion 41 in the order of the lens 40b, the spacer 6c, and the lens 40a.

The optical apparatus 1 configured as described above is assembled in the following manner.

First, the holder 2 is mounted to the substrate 90.

In this case, the holder 2 is fixed to the substrate 90 such that the imager 91 is located in the center of the opening of the large-diameter cylindrical portion 20. Any fixing method may be used, such as screwing or bonding.

Then, the lenses 30a and 30b, and the spacers 6a and 6b are accommodated in the barrel 3. In this case, the lenses 30a and 30b, and the spacers 6a and 6b are joined to one another by means of an adhesive or the like, relative to the fixing ring 39, in the order of the lens 30a, the spacer 6a, the lens 30b, and the spacer 6b.

The lenses 40a and 40b, and the spacer 6c are accommodated in the cap 4. In this case, the lenses 40a and 40b, and the spacer 6b of the lens module 5, which are housed in the cap 4, are joined to one another by an adhesive or the like, relative to the claw portion 41, in the order of the claw portion 41, the lens 40b, the spacer 6c, and the lens 40a.

The cap 4 is then mounted to the barrel 3, and the barrel 3 is mounted to the holder 2. In this case, the cap 4 is threadably inserted into the barrel 3, and the barrel 3 is further threadably inserted into the holder 2. The threads provided on these components are threaded in the same direction. Therefore, the cap 4 does not detach from the barrel 3 when the barrel 3, to which the cap 4 is mounted, is further mounted to the holder 2.

Hereinafter, a method for forming the holder 2 will be described.

The lens module 5 configures the optical apparatus 1 of the present embodiment. At low temperatures, the lens module 5 forms a focus on a position on the optical axis near the lens 30a that is located nearest to the imager 91. At high temperatures, the lens module 5 forms a focus on a position on the optical axis further from the lens 30a.

Figure 3:
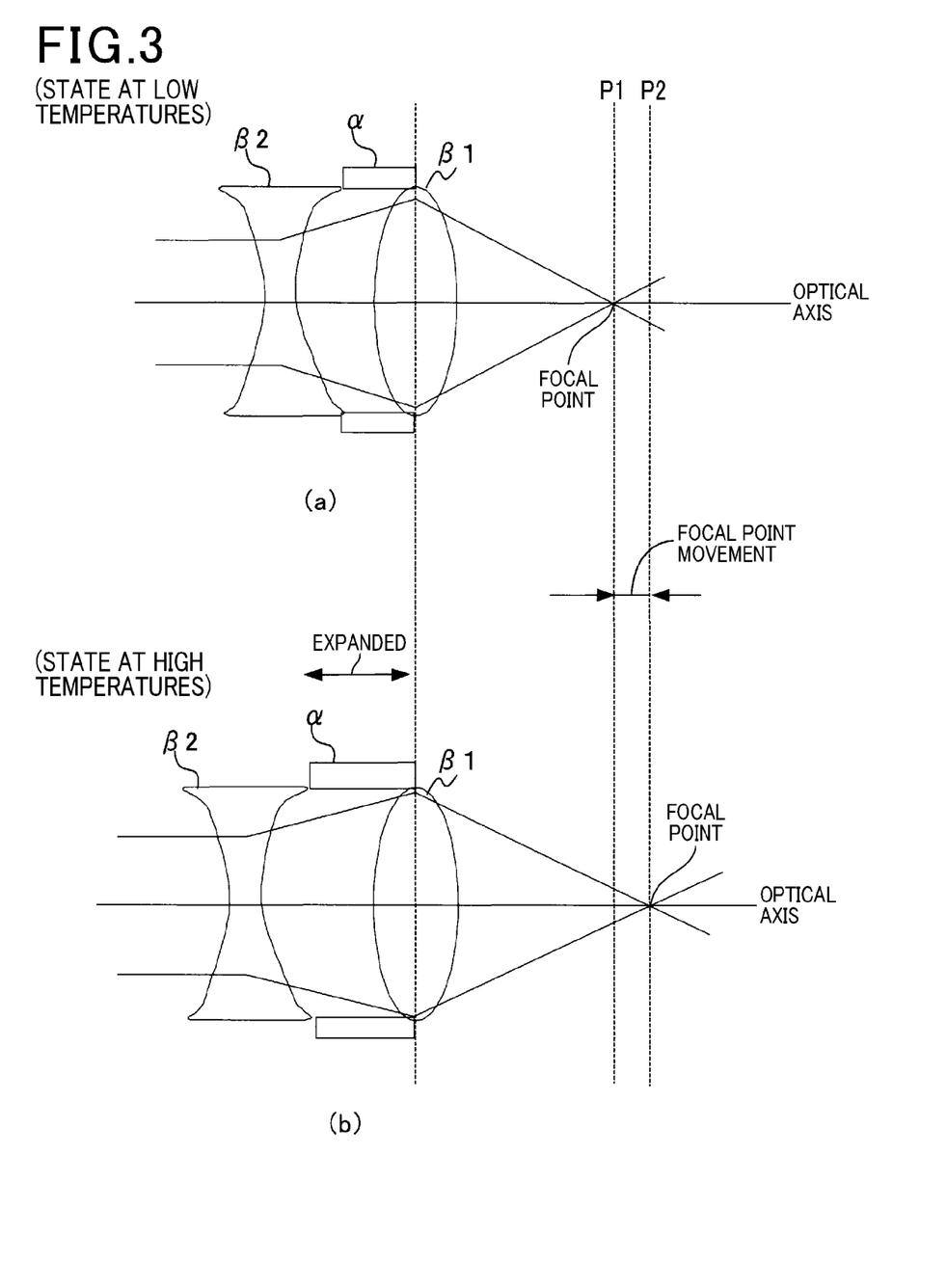
FIG. 3 is a schematic diagram illustrating the principle of focal point movement of a lens module in the optical apparatus according to the embodiment, in which (a) shows a low-temperature state and (b) shows a high-temperature state.

Reasons for this will be described with reference to the schematic diagrams of FIG. 3 shown by (a) and (b). In (a) and (b) of FIG. 3, the two lenses 30a and 30b in the lens module 5 of the present embodiment are represented by β1 and β2, respectively, while the spacer 6a between the two lenses 30a and 30b is represented by α.

At low temperatures shown in FIG. 3 by (a), focus occurs at position P1 on the optical axis near the lens β1 nearest to the imager. On the other hand, at high temperatures shown in FIG. 3 by (b), compared to at low temperatures, the spacer α expands or contracts in a direction along the optical axis and at the same time the lenses β1 and β2 expand. In addition, the physical properties, that is, the refractive indexes of the lenses β1 and β2 also achieve a change. As a result, focus occurs at position P2 on the optical axis far from the lens β1 (corresponding to the lens 30a nearest to the imager 91 in the present embodiment).

Therefore, the holder 2 of the present embodiment is formed of a temperature compensating material of which an expansion-contraction ratio, at which the holder 2 expands or contracts in a direction along the optical axis in accord with the changes of the ambient temperature of the optical apparatus 1, becomes a first expansion-contraction ratio at which the holder 2 expands or contracts so as to cancel the movement of the focal point that occurs in the lens module 5 (referred to, hereafter, as "focal point movement") along the optical axis in accord with the changes of the ambient temperature of the optical apparatus 1.

Specifically, in the lens module 5 of the present embodiment, the focal point moves in substantially direct proportion to the temperature (e.g., 0.25 µm/° C.). Therefore, in conformity with this, the holder 2 is also formed so as to expand and contract at the first expansion-contraction ratio (e.g., 0.25 µm/° C.).

Figure 4:
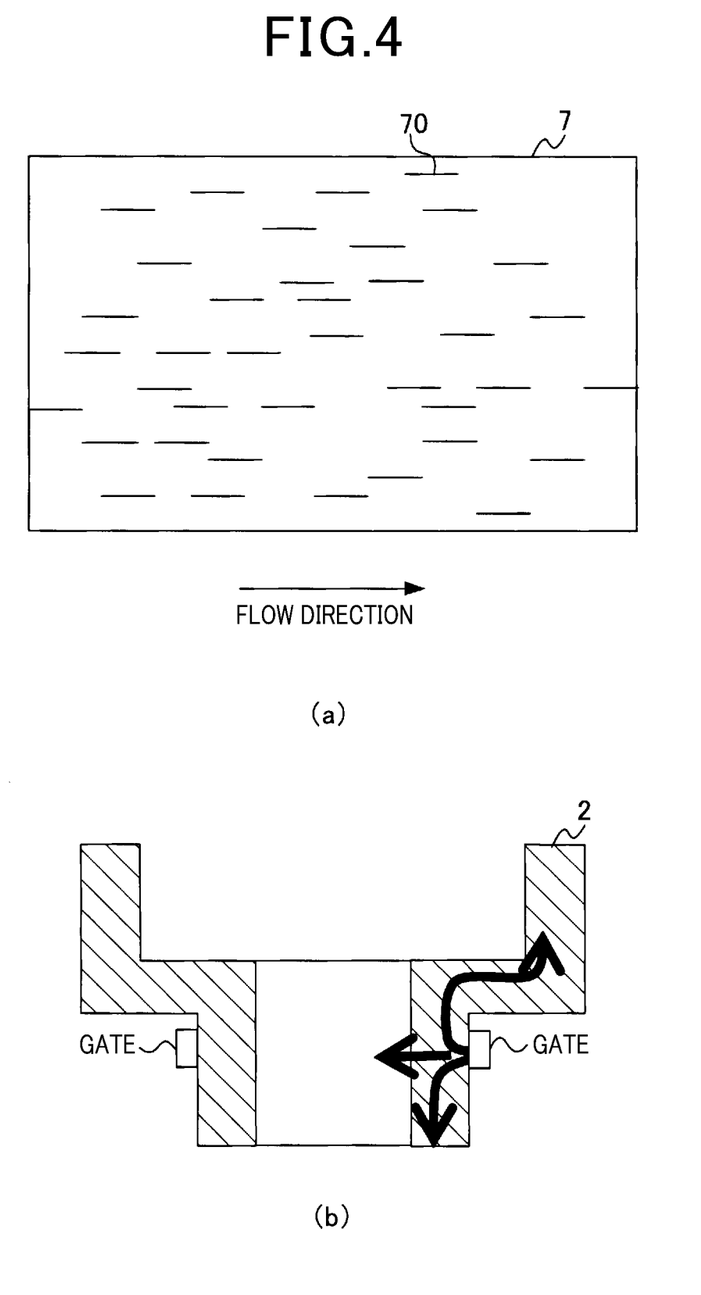
FIG. 4 is a schematic diagram illustrating a method for manufacturing a holder, in which (a) shows a synthetic resin and (b) shows a method for injection molding.

The temperature compensating material is a synthetic resin 7 that contains glass fibers 70 as shown in FIG. 4 by (a).

The holder 2 is formed by injection-molding the synthetic resin 7. In performing injection molding, the array direction of the glass fibers 70 is adjusted to thereby fabricate the holder 2 that expands and contracts at the first expansion-contraction ratio (e.g., 0.25 µm/° C.).

In the synthetic resin 7 that contains the glass fibers, the glass fibers 70 are arrayed along the flow direction of the synthetic resin 7 in injection molding. Therefore, the synthetic resin 7 is provided with characteristics of being likely to expand and contract in the direction perpendicular to the flow direction, and unlikely to expand and contract in the direction along the flow direction.

Therefore, as shown in FIG. 4 by (b), when the holder 2 is injection-molded, the positional change of the gate for injecting the synthetic resin 7 means the change in the flow of the synthetic resin 7. Thus, the gate position is adjusted such that the holder 2 has the first expansion-contraction ratio after injection molding.

In this case, the gate position is adjusted such that the proportion of the glass fibers 70 disposed along the optical axis and the proportion of the glass fibers 70 disposed perpendicular to the optical axis are in conformity with the first expansion-contraction ratio.

For example, in the synthetic resin 7 configuring the holder 2, the share of the portion in which the glass fibers 70 are oriented along the optical axis may be equal to the share of the portion in which the glass fibers 70 are oriented perpendicular to the optical axis. In this case, the expansion-contraction ratio of the holder 2 is a mean value of the expansion-contraction ratios of both portions.

Next, a method for forming the barrel 3 will be described.

As described above, the focal point movement occurs in the lens module 5. The focal point movement occurs due to expansion and contraction of the spacers 6a and 6b along the optical axis direction, expansion of the lenses 30a and 30b, changes in the physical properties, or the like.

Of these causes, the expansion and contraction of the spacers 6a and 6b cause a change in the distance between the lenses 30a and 30b. Therefore, when the barrel 3 is configured to hinder this change, there is a possibility that the lenses 30a and 30b are broken. Specifically, there is a possibility that the movement is restricted by the fixing ring 39 or the cap 4.

Therefore, the barrel 3 is formed of an elastic material having a second expansion-contraction ratio in preparation for the case where the ambient temperature of the optical apparatus 1 changes. The second expansion-contraction ratio is equal to or greater than an expansion-contraction ratio at which the lens module 5 expands and contracts along the optical axis due to the expansion and contraction of the spacers 6a and 6b, or the like.

Similar to the holder 2, the elastic material may be the synthetic resin 7 into which the glass fibers 70 are mixed. The expansion-contraction ratio along the optical axis of the barrel 3 is adjusted to the second expansion-contraction ratio on the basis of the proportion of the glass fibers 70 disposed along the optical axis and the proportion of the glass fibers 70 disposed perpendicular to the optical axis.

Next, a method for forming the cap 4 will be described.

As described above, in the lens module 5, the lenses 40a and 40b expand with the change of the ambient temperature of the optical apparatus 1, which leads expansion or contraction of the spacer 6c.

Among these, the spacer 6c expands or contracts, which changes the distance between the lenses 40a and 40b. Therefore, if the size of the housing space 45 in the cap 4 remains unchanged to thereby hinder the change in the distance between the lenses 40a and 40b, there is a possibility that the lenses 40a and 40b are broken. Specifically, there is a possibility that the movement is restricted by the claw portion 41 or the barrel 3.

Therefore, the cap 4 is formed of an elastic material having a third expansion-contraction ratio in preparation for the case where there is a change in the ambient temperature of the optical apparatus 1. The third expansion-contraction ratio is equal to or greater than the expansion-contraction ratio by which the lens module 5 expands and contracts along the optical axis due to the expansion and contraction of the spacer 6c, and the like.

Similar to the holder 2, the synthetic resin 7 into which the glass fibers 70 are mixed is used as the elastic material. The cap 4 is adjusted to have the third expansion-contraction ratio along the optical axis on the basis of the proportion of the glass fibers 70 disposed along the optical axis and the proportion of the glass fibers 70 disposed perpendicular to the optical axis.

Hereinafter is described a movement that occurs in the optical apparatus 1 in accord with the changes in the ambient temperature of the optical apparatus 1.

As described above, as shown in FIG. 2 by (a), in the optical apparatus 1 of the present embodiment, the imaging light captured by the lens module 5 is focused on the imager 91 at low temperatures.

However, when the temperature surrounding the optical apparatus 1 becomes high, the high temperature causes expansion of the lenses 30a, 30b, 40a and 40b and changes in the physical properties, i.e. the refractive indexes, of the lenses in the lens module 5, as shown in FIG. 2 by (b).

Further, the high temperature also causes expansion or contraction of the spacers 6a, 6b and 6c along the optical axis.

As a result, the focal point of the lens module 5 moves rearward relative to the imager 91. Here, the holder 2 has the first expansion-contraction ratio that can cancel the focal point movement of the lens module 5, and expands or contracts along the optical axis in conformity with the focal point movement of the lens module 5, thereby moving the lens module 5 forward. Thus, the focal point is not defocused from the imager 91.

On the other hand, when the temperature surrounding the optical apparatus 1 becomes low, the low temperature causes contraction of the lenses 30a, 30b, 40a and 40b and changes in the physical properties, i.e. the refractive indexes, of the lenses, as shown in FIG. 2 by (a). Further, the low temperature also causes contraction of the spacers 6a, 6b and 6c also along the optical axis. Therefore, the focal point of the lens module 5 moves forward relative to the imager 91.

Here, the holder 2 contracts along the optical axis in conformity with the focal point movement of the lens module 5, thereby moving the lens module 5 rearward. Thus, the focal point is not defocused from the imager 91.

In the optical apparatus 1 described above, the holder 2 is only required to be of a size enabling the lens module 5 to be disposed at a position away from the imager 91 by a predetermined distance. Unlike a conventional optical apparatus, the holder 2 is not required to be of a size reaching a position away from the lens module 5, the position being on the opposite side of the position where the imager 91 is located when viewed from the lens module 5. Therefore, increase in size of the optical apparatus 1 is minimized.

The optical apparatus 1 of the present embodiment is configured such that, in spite of the occurrence of the focal point movement in the lens module 5 due to the increase in the ambient temperature of the optical apparatus 1, the holder 2 expands or contracts to cancel the focal point movement. Thus, the lens module 5 is usable. The holder 2 can be configured by one synthetic resin 7 of which an expansion-contraction ratio when the holder 2 is formed becomes the first expansion-contraction ratio.

According to the present embodiment, the holder 2 that expands and contracts at the first expansion-contraction ratio can be formed by an easy method of adjusting only the gate position in performing injection molding. This adjustment leads to the adjustment in the proportion of the glass fibers 70 disposed along the optical axis and the proportion of the glass fibers 70 disposed perpendicular to the optical axis.

In the optical apparatus 1 of the present embodiment, the barrel 3 is formed of the synthetic resin 7 having the second expansion-contraction ratio which is equal to or greater than the expansion-contraction ratio of the lens module 5. In addition, the cap 4 is also composed of the synthetic resin 7 having the third expansion-contraction ratio which is equal to or greater than the expansion-contraction ratio of the lens module 5. Therefore, the lens module 5 is prevented from the expansion and contraction, and thus the lenses 30a, 30b, 40a and 40b are prevented from breakage.

The second and third expansion-contraction ratios may be the same.

Other Embodiments

An embodiment has so far been described. However, the present invention recited in the claims is not limited to the above embodiment but may be provided in various modes.

Figure 5:
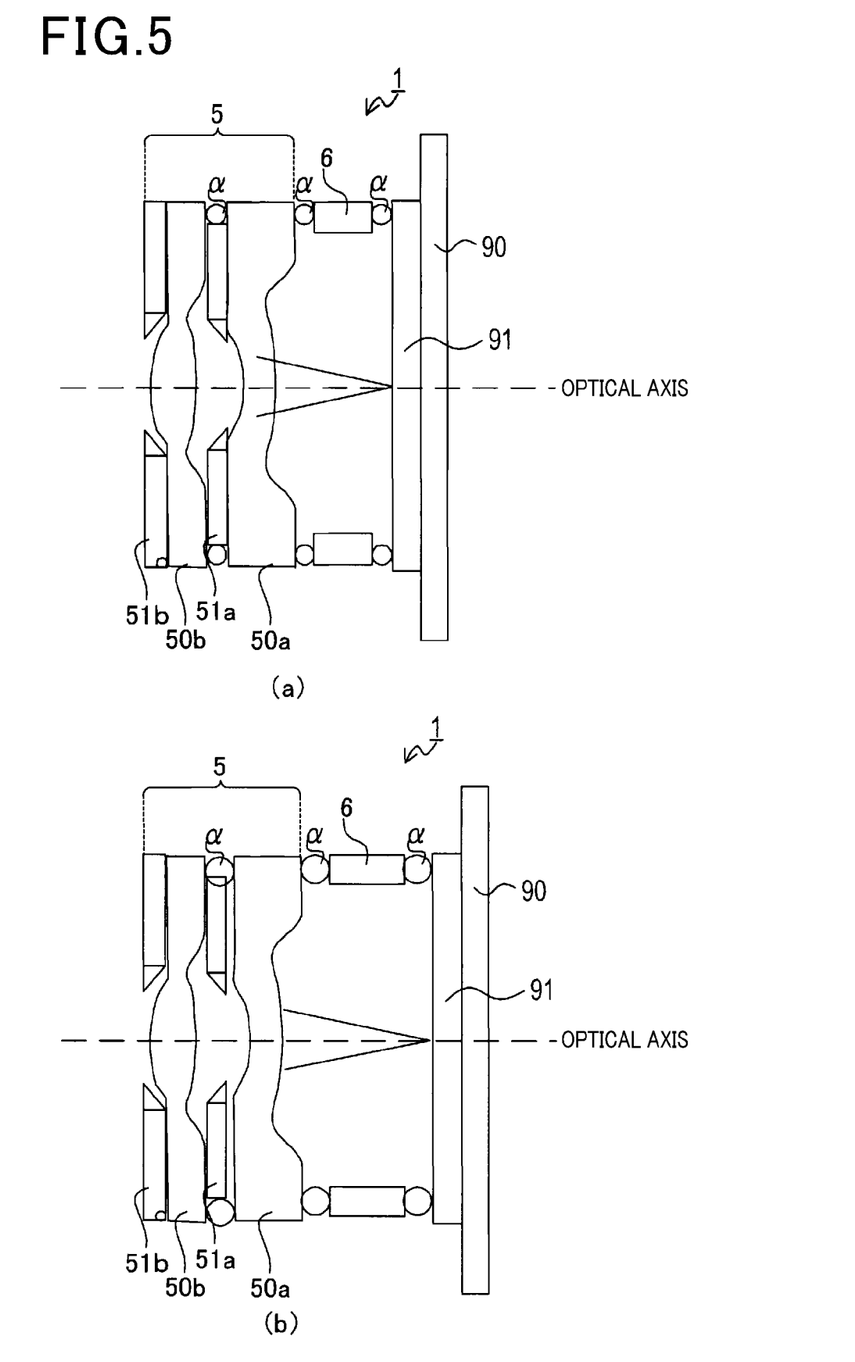
FIG. 5 is a schematic diagram illustrating a side view of an optical apparatus according to another embodiment, in which (a) shows a low-temperature state and (b) shows a high-temperature state.

(1) In the above embodiment, the optical apparatus 1 has a structure in which the lens module 5 is supported by the holder 2 via the barrel 3 or the like. However, as shown in FIG. 5 by (a), the optical apparatus 1 may have a simple structure in which the lens module 5 is simply mounted to the imager 91 via a spacer 6.

In this case, the spacer 6 corresponds to the holder 2 of the above embodiment. In the optical apparatus 1 shown in FIG. 5, the ring-shaped spacer 6 is bonded onto the imager 91 by means of an adhesive α. Further, the lens module 5 is bonded onto the spacer 6 in a forward direction by means of the adhesive α.

The lens module 5 includes two lenses 50a and 50b, a light shielding member 51a, and a light shielding member 51b. The light shielding member 51a is disposed between the lenses 50a and 50b. The light shielding member 51b is disposed in a forward direction of the lens 50b. The lenses 50a and 50b are joined to one another by means of the adhesive α.

The light shielding member 51a is joined to the lenses 50a and 50b by means of the adhesive α, while the light shielding member 51b is joined to the lens 50b by means of the adhesive α.

When the temperature surrounding the optical axis 1 becomes high, the high temperature causes expansion of the lenses 50a and 50b in the lens module 5, and causes expansion of the adhesive α, as shown in FIG. 5 by (b), thereby increasing the distance between the lenses 50a and 50b.

As a result, the focal point of the lens module 5 is placed rearward of the imager 91. Similar to the holder 2 of the above embodiment, compensation is made such that the focal point will be placed on the imager 91 by expanding or contracting the spacer 6 and moving the lens module 5 forward.

On the other hand, when the temperature surrounding the optical apparatus 1 becomes low, compensation similar to the above embodiment is made. Specifically, the focal point of the lens module 5 to be placed forward of the imager 91 is compensated so as to be placed on the imager 91 by the contraction of the spacer 6.

The advantageous effects of the present embodiment are similar to those of the above embodiment.

The spacer 6 may, of course, be bonded onto the substrate 90 rather than onto the imager 91.

(2) In the above embodiment, the synthetic resin 7 into which the glass fibers 70 are mixed is used as the temperature compensating material configuring the holder 2. However, the temperature compensating material is not limited to this. For example, the fibrous material to be mixed is not limited to the glass fibers 70. Further, the temperature compensating material may be the synthetic resin alone in which the glass fibers 70 are not mixed, or other materials.

(3) In the above embodiment, the lens module 5 includes four lenses (30a, 30b, 40a and 40b). However, the lens module 5 is not limited to this. For example, the lens module 5 may be of any type as long as two or more lenses are combined in the lens module.

(4) The above embodiment has been described by way of an example in which a CCD is used as an image pickup device configuring the imager 91. However, the image pickup device is not limited to this. For example, any type of mage pickup device may be used, such as a complementary metal-oxide semiconductor (CMOS) mage pickup device.

(5) In the above embodiment, no specific mention is made of the materials used for the lenses 30a, 30b, 40a and 40b, accessories, and the like. These components may be made of glass or a resin, or may be provided with a lamination by reflection treatment to the lens surface. In addition, an optical low-pass filter treatment may be given to the components.

(6) In the above embodiment, no specific mention is made of the materials used for the spacers 6a to 6c. However, any material, such as metal or a synthetic resin, may be used as long as the material can be used as a spacer.

(7) The above embodiment has been described by way of an example in which the optical apparatus 1 is used in a camera for monitoring ahead of a vehicle. However, use of the optical apparatus 1 is not limited to this. For example, the optical apparatus 1 can be used in any imaging system as long as the optical apparatus can be applied to the imaging system. For example, the optical apparatus 1 can be applied to optical-apparatus-applicable imaging systems, including other vehicle cameras, such as cameras for monitoring behind a vehicle or cameras for monitoring lateral direction of a vehicle, or cameras used for something else other than vehicles.

REFERENCE SIGNS LIST 1 optical apparatus
2 holder
3 barrel
4 cap
5 lens module
6 spacer
6a to 6c spacer
7 synthetic resin
20 large-diameter cylindrical portion
21 small-diameter cylindrical portion
30a, 30b lens
39 fixing ring
40a, 40b lens
41 claw portion
42 hole portion
45 housing space
50a, 50b lens
51a, 51b light shielding member
70 glass fiber
90 substrate
91 imager

The invention claimed is:

1. An optical apparatus that captures imaging light entering into an imager to acquire an image of an object, the optical apparatus comprising:
a lens module configured by a combination of two or more lenses, which captures the imaging light through the lenses, and focuses the captured imaging light on the imager;
a support that supports the lens module at a position apart from the imager by a predetermined distance, such that the imager and the lenses are aligned on the optical axis, and a focal point of the imaging light is formed on the imager, wherein
the support is formed such that an expansion-contraction ratio, at which the support expands or contracts along the optical axis in accord with changes in ambient temperature of the optical apparatus, becomes a first expansion-contraction ratio at which the support expands or contracts so as to cancel a movement of the focal point occurring in the lens module along the optical axis in accord with the changes in ambient temperature of the optical apparatus, and a size in a direction perpendicular to the optical axis of a space in which the imager is held in the support is larger than a size in a direction perpendicular to the optical axis of a space in which the lens module is held in the support.

2. The optical apparatus according to claim 1, wherein the support is composed of a temperature compensating material into which a fibrous material is mixed, and formed such that the expansion-contraction ratio becomes the first expansion-contraction ratio by adjusting a proportion of the fibrous material disposed along the optical axis and a proportion of the fibrous material disposed perpendicular to the optical axis.

3. The optical apparatus according to claim 1, further comprising
a barrel that houses at least a portion of the lens module that expands and contracts along the optical axis in accord with changes in ambient temperature of the optical apparatus, and expands and contracts at a second expansion-contraction ratio that is equal to or greater than the expansion-contraction ratio of the lens module.

4. The optical apparatus according to claim 3, further comprising
a cap that is mounted to the barrel on a side opposite to the side where the support is mounted, wherein
the lens module is set up in the barrel and in the cap, and
the cap has a housing space that is capable of housing at least a portion of the lens module, and expands and contracts at a third expansion-contraction ratio that is equal to or greater than the expansion-contraction ratio of the lens module.

5. The optical apparatus according to claim 1, wherein the support is fixed onto a substrate to which the imager is mounted.

6. The optical apparatus according to claim 1, wherein the support is fixed to the imager.

7. An imaging system comprising:
an imager; and
an optical apparatus that captures imaging light entering into the imager to acquire an image of an object;
wherein the optical apparatus includes:
a lens module configured by a combination of two or more lenses, which captures the imaging light through the lenses, and focuses the captured imaging light on the imager; and
a support that supports the lens module at a position apart from the imager by a predetermined distance, such that the imager and the lenses are aligned on the optical axis, and a focal point of the imaging light is formed on the imager, wherein
the support is formed such that an expansion-contraction ratio, at which the support expands or contracts along the optical axis in accord with changes in ambient temperature of the optical apparatus, becomes a first expansion-contraction ratio at which the support expands or contracts so as to cancel a movement of the focal point occurring in the lens module along the optical axis in accord with the changes in ambient temperature of the optical apparatus, and
a size in a direction perpendicular to the optical axis of a space in which the imager is held in the support is larger than a size in a direction perpendicular to the optical axis of a space in which the lens module is held in the support.

8. The optical apparatus according to claim 2, further comprising
a barrel that houses at least a portion of the lens module that expands and contracts along the optical axis in accord with changes in ambient temperature of the optical apparatus, and expands and contracts at a second expansion-contraction ratio that is equal to or greater than the expansion-contraction ratio of the lens module.

9. The optical apparatus according to claim 2, wherein the support is fixed onto a substrate to which the imager is mounted.

10. The optical apparatus according to claim 3, wherein the support is fixed onto a substrate to which the imager is mounted.

11. The optical apparatus according to claim 4, wherein the support is fixed onto a substrate to which the imager is mounted.

12. The optical apparatus according to claim 2, wherein the support is fixed to the imager.

13. The optical apparatus according to claim 3, wherein the support and the barrel are formed separately from each other.

14. The optical apparatus according to claim 8, wherein the support and the barrel are formed separately from each other.

15. The imaging system according to claim 7, further comprising
a barrel that houses at least a portion of the lens module that expands and contracts along the optical axis in accord with changes in ambient temperature of the optical apparatus, and expands and contracts at a second expansion-contraction ratio that is equal to or greater than the expansion-contraction ratio of the lens module.

16. The imaging system according to claim 15, wherein the support and the barrel are formed separately from each other.

* * * * *